(No Model.)  5 Sheets—Sheet 1.

C. G. OTIS.
ELEVATOR.

No. 377,635. Patented Feb. 7, 1888.

WITNESSES:
A. Faber du Faur
William Miller

INVENTOR
Charles G. Otis.
BY Van Santvoord & Hauff,
his ATTORNEYS (No Model.)  5 Sheets—Sheet 2.

C. G. OTIS.
ELEVATOR.

No. 377,635. Patented Feb. 7, 1888.

WITNESSES:

INVENTOR
Charles G. Otis.
BY
his ATTORNEYS.

(No Model.) 5 Sheets—Sheet 3.
C. G. OTIS.
ELEVATOR.
No. 377,635. Patented Feb. 7, 1888.
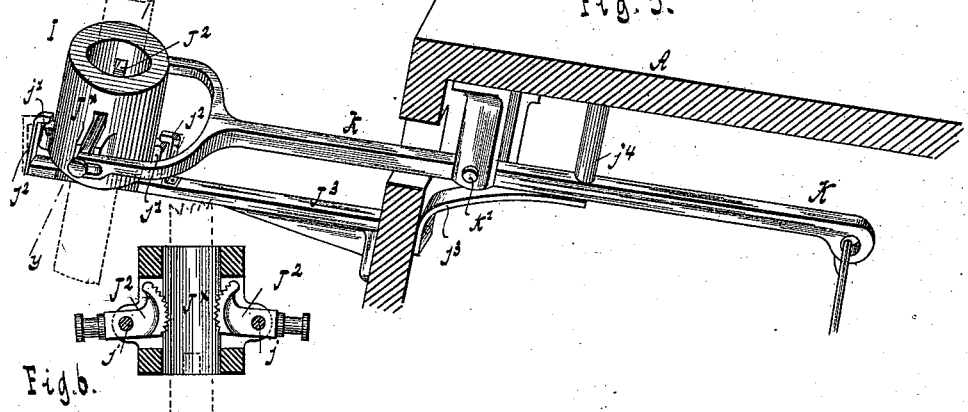
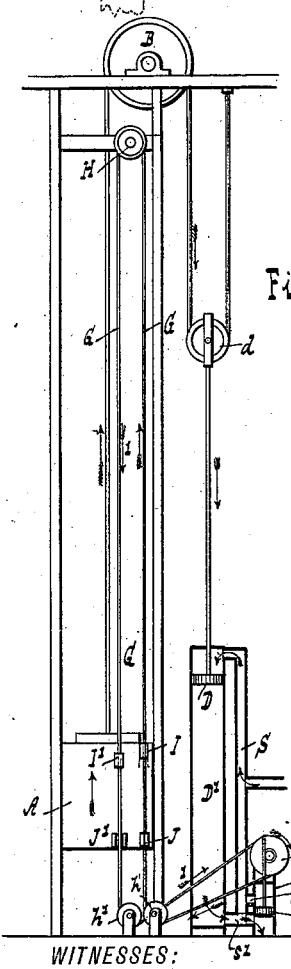
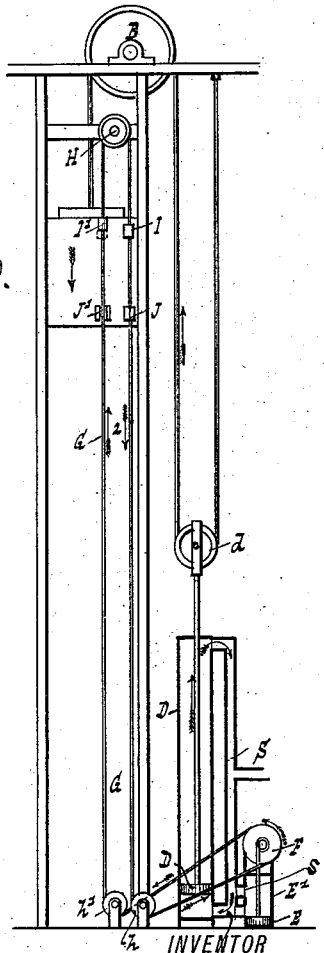
WITNESSES:
INVENTOR
Charles G. Otis.
BY
his ATTORNEYS

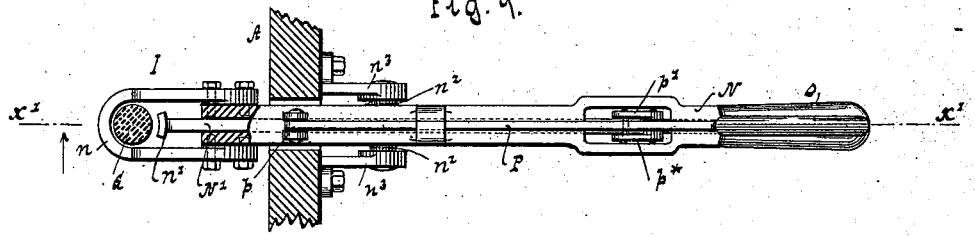
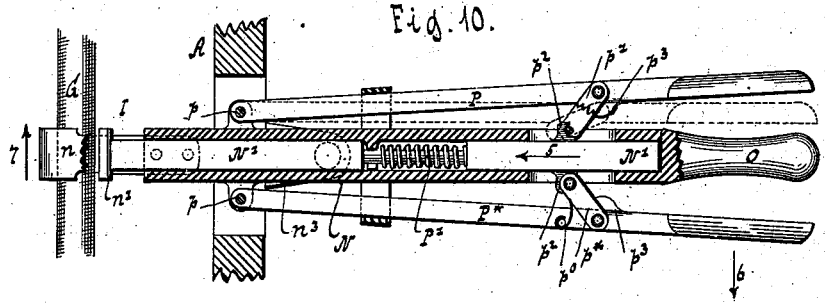
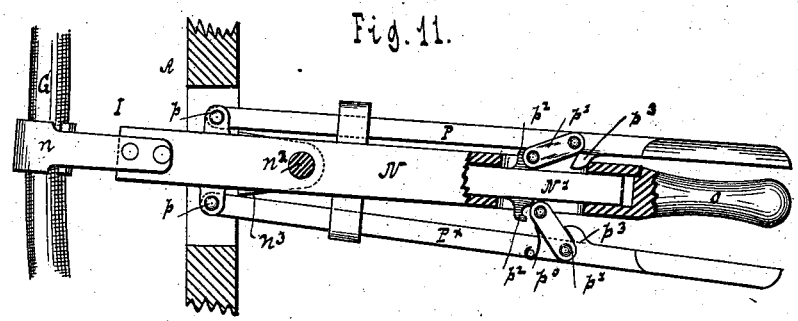
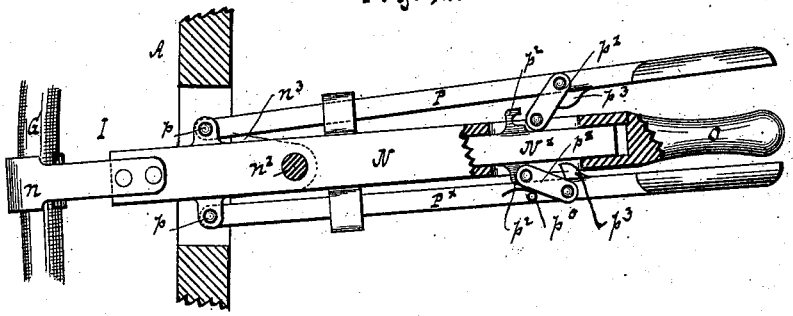

(No Model.)  5 Sheets—Sheet 5.

C. G. OTIS.
ELEVATOR.

No. 377,635. Patented Feb. 7, 1888.

WITNESSES:
A. Faber du Faur
William L. Miller

INVENTOR
Charles G. Otis.
BY Van Santvoord & Hauff,
his ATTORNEYS

UNITED STATES PATENT OFFICE.

CHARLES G. OTIS, OF BROOKLYN, NEW YORK.

ELEVATOR.

SPECIFICATION forming part of Letters Patent No. 377,635, dated February 7, 1888.

Application filed August 18, 1887. Serial No. 247,289. (No model.)

*To all whom it may concern:*

Be it known that I, CHARLES G. OTIS, a citizen of the United States, residing at Brooklyn, in the county of Kings and State of New York, have invented new and useful Improvements in Elevators, of which the following is a specification.

This invention consists in an improved operating mechanism for elevator-valves in which the movement of the elevator is employed to operate the valve, as is fully set forth in the following specification and claims, and illustrated in the accompanying drawings, in which—

Figure 1:
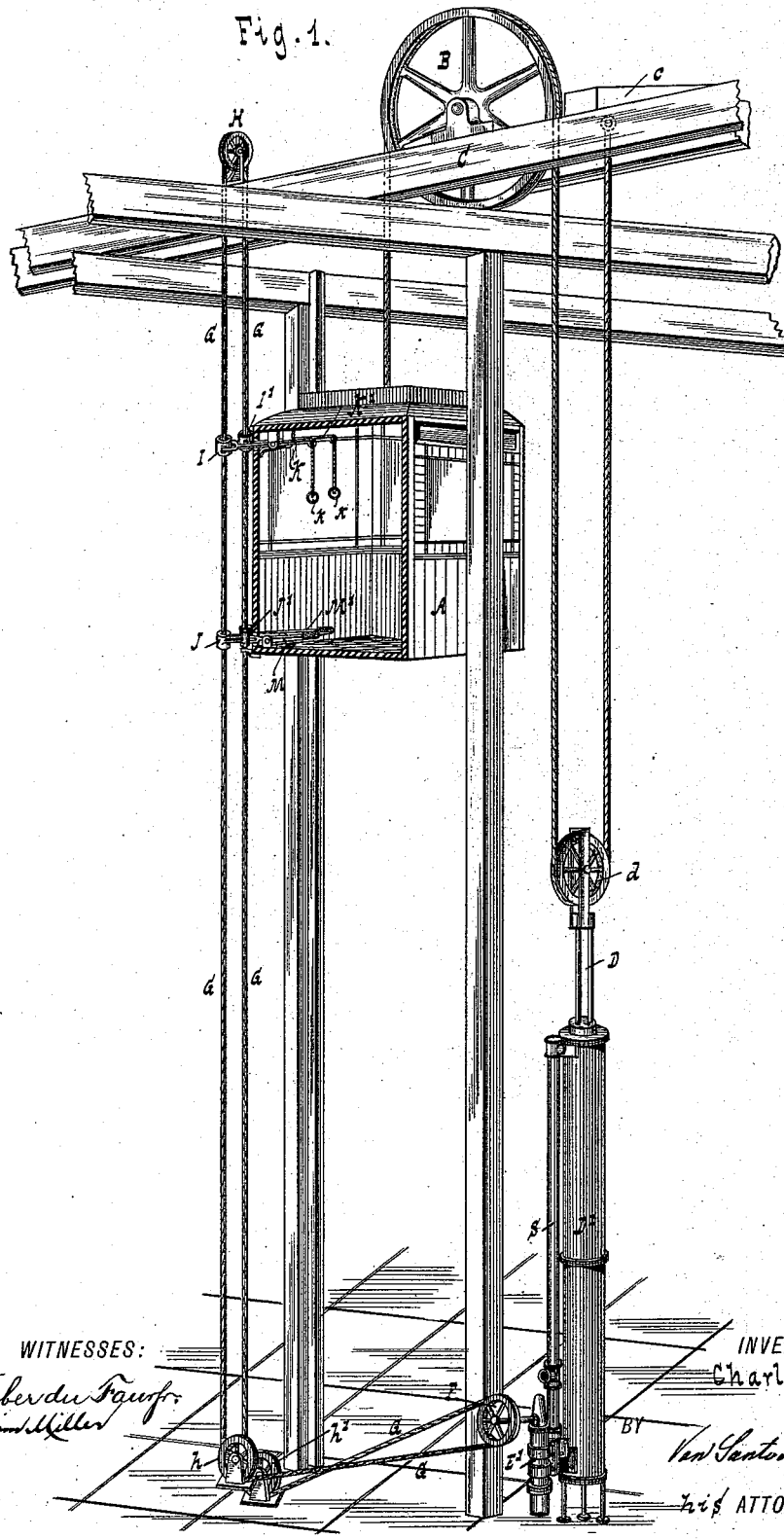
Figure 2:
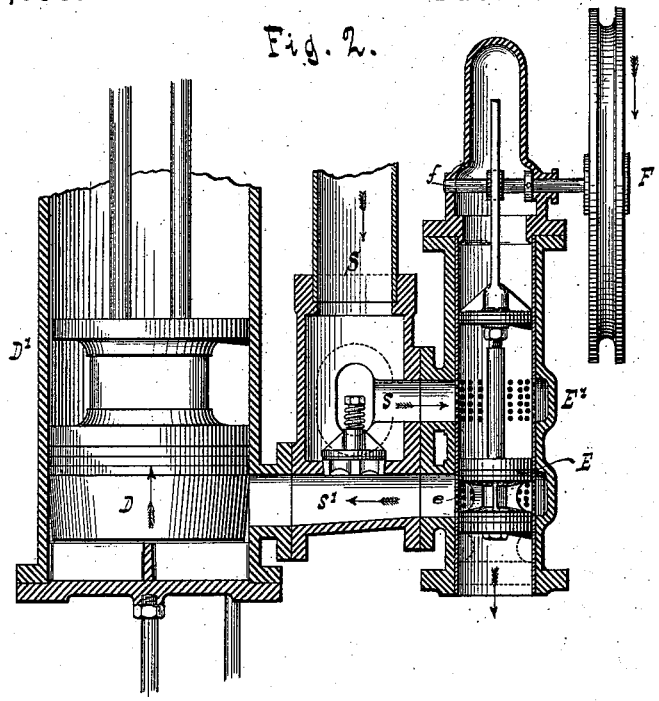
Figure 3:
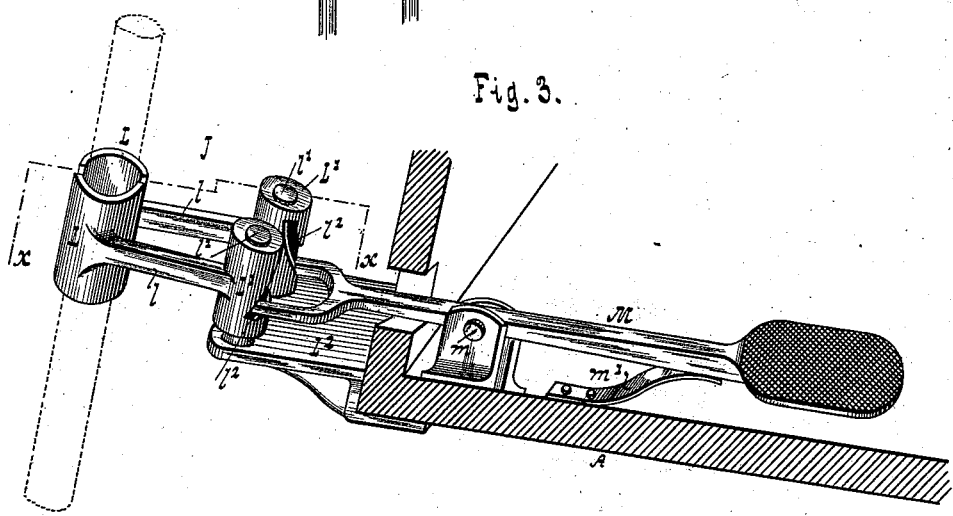
Figure 4:
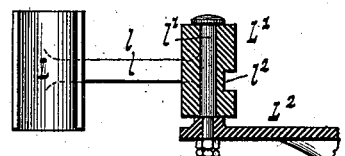
Figure 13:
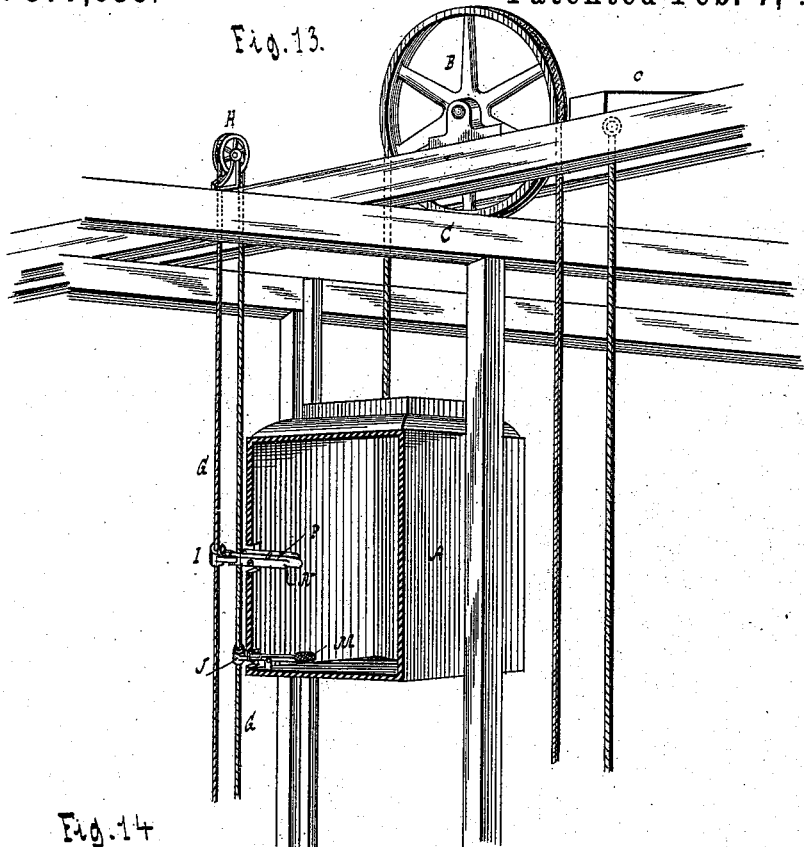
Figure 14:
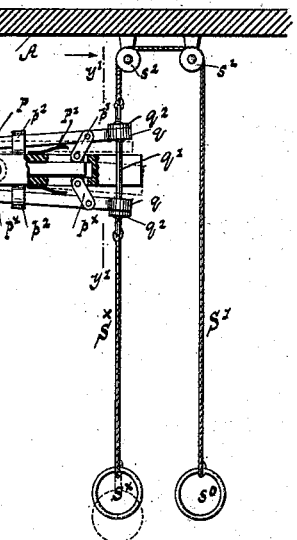
Figure 15:
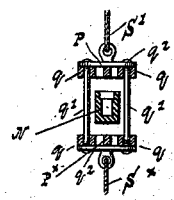
Figure 16:
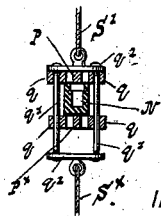

Figure 1 represents a perspective view of an elevator containing my invention. Fig. 2 is a central vertical section, on a larger scale than Fig. 1, of a portion of the elevator-engine. Fig. 3 is a sectional perspective of a "secondary" grip. Fig. 4 is a section in the plane $x$ $x$, Fig. 3. Fig. 5 is a sectional perspective of a "primary" grip. Fig. 6 is a section in the plane $y$ $y$, Fig. 5. Figs. 7 and 8 are diagrams showing the movements of parts. Fig. 9 is a sectional elevation of a modified form of grip. Fig. 10 is a section in the plane $x'$ $x'$, Fig. 9. Figs. 11 and 12 are similar views illustrating the movement of the grip. Fig. 13 is a perspective view showing the grip applied to the car. Fig. 14 is a sectional elevation of a modified form of the grip shown in Figs. 9, 10, and 11. Fig. 15 is a vertical section in the plane $y'$ $y'$, Fig. 14. Fig. 16 is a similar section illustrating the operation of the grip.

Similar letters indicate corresponding parts.

In the drawings, the letter A designates the elevator-car, from which extends a rope over a sheave, B, which turns in an axle having bearings in boxes that are firmly attached to the beams C. From the sheave B the rope extends beneath a sheave, $d$, and thence upwardly to a beam, $c$, where it is firmly secured. The sheave $d$ is mounted in a cage firmly secured to the rod of the piston D of the hydraulic engine. This hydraulic engine is of a usual construction, and is herein briefly described and shown in detail only for the purpose of more clearly showing the operation of the elevator.

Referring at present to Fig. 2, D' is the main cylinder, which contains the piston D, and E' is the valve-cylinder containing a piston-valve, E. S is the supply-pipe, which is connected with the upper end of the cylinder, Fig. 1, and also by a port, $s$, with the valve-cylinder E', Fig. 2. A second port, $s'$, connects the lower end of the main cylinder D' with the valve-cylinder E'. The valve E is reciprocated to open and close the port $s'$ by a rack-and-gear connection with a shaft, $f$, upon which is mounted a pulley, F. When the valve E is in the position shown by full lines in Fig. 2, it closes the port $s'$, and the elevator-car is stationary; but if it is moved downward to the position shown by dotted lines in Fig. 2 the water can enter the cylinder beneath the piston, as indicated by the arrows in said figure. In this case the car can descend, and the water above the piston is forced through the supply-pipe and beneath the piston. The weight of the car is sufficient to cause its descent and the engine does no work. If the valve E is moved upward to open the port $s'$, the water beneath the piston D can escape through an outlet, $e$, in the valve-cylinder, and the full pressure of the water comes on the upper surface of the piston, whereby the latter is caused to descend and the elevator-car is correspondingly raised, all as usual.

Referring to Fig. 1, the pulley F, connected with valve E, is actuated by means of an endless valve-rope, G. Said valve-rope extends about a sheave, H, having bearings in boxes secured to the beam C at the upper end of the elevator-shaft, from thence downward and over idler-wheels $h$ $h'$, having bearings in boxes secured to the floor at the lower end of the elevator-shaft, and, finally, it extends around pulley F. The valve-rope G passes in close proximity to one side of the elevator-car A, the two strands being in a plane parallel to the said side.

Heretofore the valve-rope G passed through the elevator-car and was shifted by the attendant to oscillate the pulley F, whereby the valve E was moved and the car caused either to rise, to descend, or to stop. In my invention the valve-rope is moved slightly by the attendant to open the valve slightly, whereupon the rope is moved by the car in its motion to fully open the valve.

In order to set the car in motion or to arrest its motion, I make use of the following devices which engage with the valve-rope E and move the same to said effect: The two strands of the valve-rope G, Fig. 1, are respectively adapted to be engaged by two grips, I I', which I shall hereinafter term the "primary grips;" and said strands are also adapted to be engaged, respectively, by two grips, J J', which I term the "secondary grips." The primary grips I I' are located at the top of the car, and are actuated to engage the valve-rope by the hands of the attendant. The secondary grips J J' are located at the bottom of the car, and are actuated by the foot of the attendant.

Referring to Figs. 5 and 6, the primary grips I I' are each constructed as follows: A sleeve, J*, encompasses the rope, and is provided with two projections or nibs, $j'$ $j'$, that are engaged by vertical spring-hooks $j^2$ $j^2$, carried by a bracket, $J^3$, secured to the elevator-car. The projections or nibs $j'$ $j'$ are constructed with rounded faces, so that in descending the same will force the spring-hooks $j^2$ $j^2$ apart, and the hooks will close over said nibs or projections when the sleeve is at its lowest point. At the same time the sleeve can be drawn upward and away from the hooks $j^2$ $j^2$ when sufficient force is applied. The sleeve J* is slotted for the passage of the two jaws $J^2$ $J^2$, which are pivoted eccentrically at $j$ $j$, Fig. 6, to suitable lugs rising from the sleeve. The shanks or outer ends of the jaws are engaged by the bifurcated end of a lever, K or K', which is pivoted at $k'$ to a hanger secured to the roof of the car. A suitable handle, $k$, Fig. 1, suspended by a cord attached to the free end of the lever K, (or K',) can be used to facilitate the manipulation of the said lever. A spring, $j^3$, engaging the lever K, holds the same normally against a suitable stop, $j^4$, when the parts of the grip I or I' are in the position shown in Figs. 5 and 6. When the inner end of the lever K is depressed, the jaws $J^2$ $J^2$ are turned about their pivots $j$ $j$, so as to bite into the rope, and on further movement of lever the sleeve J* is drawn from the hooks $j^2$ $j^2$ and carried upward, together with the jaws $J^2$ $J^2$, whereby the rope is caused to move on its sheaves. When the lever is released, the spring $j^3$ returns the same to its normal position against the stop $j^4$, and in this vibration of the lever the jaws $J^2$ $J^2$ are first released from the rope, and then sleeve J* is returned to the grasp of the hooks $j^2$ $j^2$.

Referring to Figs. 3 and 4, the secondary grips are each constructed as follows: The jaws L L are carried by arms $l$ $l$, projecting from sleeves L' L', which are loosely mounted on vertical spindles $l'$ $l'$, secured to a bracket or support, $L^2$, attached to the bottom of the elevator-car A. These sleeves L' L' contain inclined cam-grooves $l^2$ $l^2$, into which project prongs on the end of a foot-lever, M, (or M',) which is pivoted at $m$ to a box secured to the floor of the car. A spring, $m'$, holds the inner end of the foot-lever in its upper or normal position. When the inner end of the foot-lever is depressed, the sleeves L' L' are oscillated about their spindles, and the jaws L L firmly grip the valve-rope.

The general operation of the mechanism is as follows, Figs. 1, 2, 7, and 8: If the car is at the bottom of the shaft and is to rise, the hand-lever K of the primary grip I is depressed and subsequently released, thereby causing the valve-rope G to be moved in the direction of arrows 1, Fig. 7, and the valve E is moved from the position shown in full lines in Fig. 2 and slightly upward, and consequently the piston D is moved downward, causing a slow motion upward of the car. Immediately after the release of lever K the foot-lever M of the secondary grip J is depressed and the jaws L L grip the valve-rope. The car being in motion, the valve-rope is moved to fully open the valve E, Fig. 7, after which the foot-lever M is released by the attendant.

To arrest the motion of the car while in its upward movement, the foot-lever M' of the secondary grip J' is depressed, and the jaws L' L' thereof grip the opposite strand of the valve-rope, and consequently the rope is moved in a direction opposite to that indicated by arrows 1 in Fig. 7 until the valve E reaches its central position, as shown in Fig. 2, when the attendant releases the foot-lever. If the car is at the top of the elevator-shaft and is to descend, Fig. 8, the lever K' of the primary grip I' is depressed, whereby the valve-rope is moved in the direction of arrows 2, Fig. 8, and the car is set in motion. The hand-lever being released, the foot-lever M of the secondary grip J is depressed, and the valve-rope is moved to fully open the valve E, Fig. 8. To arrest the motion of the car in its descent, the foot-lever M' of the secondary grip J' is depressed.

If desired, the secondary grip J' can be omitted and the primary grip I used to arrest the motion of the car.

By the use of the grip for starting and stopping the car the said operation is facilitated and rendered very certain.

On inspection of Figs. 7 and 8 it will be noticed that the use of both secondary grips J J' can be dispensed with, if desired, and the primary grips I I' employed to stop the car. For instance, to cause the elevator-car to move upward the grip I is moved upward to open the motor-valve E, and to arrest the motion of the car the grip I is thrown into engagement with the valve-rope. To cause the car to descend, the grip I' is vibrated to open the valve, and then the grip I is thrown into engagement with the valve-rope to fully open the motor-valve. To arrest the motion in descending, the grip I' is caused to engage the valve-rope.

By the use of a single primary grip of a peculiar construction and a single secondary grip the elevator can be controlled by the use of these two grips alone. In this case the primary grip is used to start the car in either direction, and the secondary grip is used to arrest the motion of the same.

The construction of the primary grip is illustrated in Figs. 9, 10, 11, 12, and 13, and the construction of the secondary grip in Figs. 3 and 4, said latter grip being the same in construction and application as that used in the example previously described. In Figs. 9, 10, 11, 12 the letter $n$ represents one jaw of the grip I, which is secured to a horizontal carrier, N, that is provided with an interior longitudinal guideway for a second carrier, N'. The carrier N' can slide in the direction of its length in the carrier N, and has affixed thereto the second jaw, $n'$, of the grip. The carrier N is provided with trunnions $n^2$ $n^2$, Fig. 9, that bear in a suitable support, $n^3$, secured to the wall of the elevator-car, and the carrier N is also provided with a handle, $o$. To the top and bottom of the carrier N are pivoted at $p$ $p$ two levers, P P*, that are connected with the sliding carrier N' by pawls $p'$ $p*$, which carry pins engaging hooks or projections $p^2$ $p^2$ on the carrier N'. By depressing the lever P the pawl $p'$ engages the hook or projection $p^2$ and moves the sliding carrier N outward in the direction of arrow 5, and the jaw $n'$ is forced against the valve-rope G, and the latter is firmly clamped between the two jaws $n$ $n'$. Stops $p^3$ on the levers P' P* prevent the pawls from turning in the wrong direction when said levers are depressed, and a spring, $p^0$, holds the lower pawl against its stop. A spiral spring, P', returns the sliding carrier to its normal position as soon as the actuating-lever P is released. By moving the lever P toward the handle $o$ of the pivoted carrier N the sliding carrier is moved outward, as indicated by arrow 5, Fig. 10; but each lever P P' can be actuated independent of the other. One lever, P, would be sufficient to actuate the sliding carrier N'; but two are used to facilitate the manipulation of the device.

The pivoted carrier N can be vibrated about its trunnions $n^2$ $n^2$ in either direction, so that the valve-rod G can be drawn in either direction. When the grip I has a hold on the valve-rope and the pivoted carrier N is turned about its trunnions in the direction of arrow 6, Fig. 10, to occupy the position shown in Fig. 11, the valve-rope G is moved in the direction of arrow 7, Fig. 10, to open the engine-valve, when the carrier N is turned from the position shown in Fig. 10 to occupy the position shown in Fig. 12, the valve-rope is moved in a direction opposite to that indicated by arrow 7, Fig. 10. In the application of these grips to the car (see Fig. 13) the primary grip I is arranged to engage with one strand of the endless valve-rope G, and the secondary grip J, which is operated by the foot of the attendant, is adapted to engage with the opposite strand of the valve-rope. If the car is at the bottom of the elevator-shaft (see Fig. 7) and it is to be set in motion, the grip J is caused to clamp the rope and to move upward, whereby the valve-rope is moved in the direction of arrow 1, Fig. 7, and the valve E is partially opened. By retaining the hold of the grip I on the valve-rope the movement of the car completely opens the valve, whereupon the attendant moves the grip-carrier N to its normal position, Fig. 10. To check the movement of the car, the secondary grip J is thrown into engagement with the valve-rope G, whereby the latter is moved in a direction opposite to arrow 1, Fig. 7, until the valve E is closed, when the attendant releases the grip.

To cause the car to descend, the grip I is caused to grasp the rope, and is moved downwardly to the position shown in Fig. 12, whence the valve is partially opened, the movement of the car fully opening the latter, as before described. To arrest the motion of the car, the secondary grip J is thrown into engagement with the valve-rope and subsequently caused to release the same, as before described.

The primary grip I, above described, and illustrated in Figs. 9, 10, 11, 12, and 13, is intended to be grasped by the hand of the attendant, and is arranged at a convenient height in view thereof. It is, however, in some cases desirable that the grip I should be arranged near the roof of the car, so as to be out of the way, in which case it is actuated by means of ropes connected therewith. This modification is illustrated in Figs. 14, 15, and 16.

The operating parts of the grip are constructed, in general, as before. At or near the end of the levers P P* are lugs $q$ $q$, which project laterally therefrom and contain transverse openings, through which extend the vertical rods $q'$ $q'$ of a frame, Q. To the heads $q^2$ $q^2$, connecting the rods $q'$ $q'$ of the frame, are attached, respectively, ropes S* and S'', having suitable handles, $s*$ and $s^0$, at their lower ends. The rope S' passes over pulleys $s^2$ $s^2$. By pulling down on the rope S* the head $q^2$ engages the lever P and draws the same downward, first, to throw the grip into contact with the valve-rope G, Figs. 14 and 16, and, secondly, to turn the carrier N about its trunnions $n^2$ $n^2$, whereby the valve-rope is moved to slightly open the valve E. When the rope S' is drawn downward, the carrier N is vibrated in an opposite direction.

As shown in Fig. 14, the links $p'$ $p*$ can be used instead of the pawls to connect the levers P P* to the sliding carrier N, said links being pivoted to the latter, and instead of a spiral spring, P', acting on the sliding carrier, springs P', acting on the levers P P*, can be used.

What I claim as new, and desire to secure by Letters Patent, is—

1. The combination, with an elevator-car, its motor, a valve, and a valve-rope, of a grip carried by the car and having jaws to engage the valve-rope, said grip being adapted to move independently of the car in the direction of the valve-rope, and a lever for operating the jaws of the grip, whereby the valve can be slightly opened, the valve being fully opened by the subsequent movement of the car while the rope is under the grasp of the grip-jaws, substantially as described.

2. The combination, with the elevator-car and with the endless valve-rope, of a primary grip carried by the car and having jaws to engage one strand of the valve-rope, said grip being adapted to move independently of the car, a secondary controllable grip carried by the car and having jaws to engage the second strand of the valve-rope, and levers for operating the jaws of said grips, substantially as described.

3. The combination, with an elevator-car, a motor, its valve, and with the valve-rope, of a grip carried by the car, a lever for operating the jaws of the grip and for imparting a motion to the same in the direction of the valve-rope, and a controllable secondary grip constructed to engage with the valve-rope to close the valve, substantially as shown and described.

4. The combination, with a pivoted jaw-carrier, N, and a sliding jaw-carrier, N', of a lever connected with the carrier N, for actuating the same, and a connection between the lever and the pivoted jaw-carrier, substantially as shown and described.

5. The combination, with a pivoted jaw-carrier, N, and a sliding jaw-carrier, N', carried by the same, of a lever pivoted to the carrier N and connected with the carrier N', substantially as shown and described.

6. The combination, with a pivoted jaw-carrier, N, having a longitudinal guideway, a jaw-carrier, N', fitted to said guideway, levers P P*, pivoted to the jaw-carrier N, and a connecting-link between the levers and the jaw-carrier N', substantially as shown and described.

7. The combination, with a pivoted jaw-carrier and a sliding jaw-carrier, of a pair of levers connected with the carrier N', a movable frame in engagement with said levers, and cords or chains attached to the opposite ends of the frame, substantially as shown and described.

In testimony whereof I have hereunto set my hand and seal in the presence of two subscribing witnesses.

CHARLES G. OTIS. [L. S.]

Witnesses:
W. HAUFF,
E. F. KASTENHUBER.